United States Patent [19]
Miyagawa

[11] Patent Number: 5,455,428
[45] Date of Patent: Oct. 3, 1995

[54] PHOTO DETECTING APPARATUS

[75] Inventor: Ichirou Miyagawa, Kanagawa, Japan

[73] Assignee: Fuji Photo Film Co., Ltd., Kanagawa, Japan

[21] Appl. No.: 78,112

[22] Filed: Jun. 18, 1993

[30] Foreign Application Priority Data

Jun. 18, 1992 [JP] Japan ............... 4-159260

[51] Int. Cl.$^6$ .................... G03B 42/00; G03B 42/02
[52] U.S. Cl. ........................... 250/586; 250/585
[58] Field of Search ................. 250/585, 586, 250/235; 358/484, 494, 496

[56] References Cited

U.S. PATENT DOCUMENTS

| | | |
|---|---|---|
| 4,258,264 | 3/1981 | Kotero et al. . |
| 4,276,473 | 6/1981 | Kato et al. . |
| 4,315,318 | 2/1982 | Kato et al. . |
| 4,346,295 | 8/1982 | Tanaka et al. . |
| 4,387,428 | 1/1983 | Ishida et al. . |
| 4,485,302 | 11/1984 | Tanaka et al. . |
| 4,680,473 | 1/1987 | Matsuda et al. . |
| 4,775,791 | 10/1988 | Owen et al. ............ 358/484 X |
| 4,818,880 | 4/1989 | Matsuda et al. . |
| 5,138,161 | 8/1992 | Miyagawa et al. .......... 250/586 |

FOREIGN PATENT DOCUMENTS

| | | |
|---|---|---|
| 56-12601 | 2/1981 | Japan . |
| 56-11395 | 2/1981 | Japan . |
| 61-65231 | 4/1986 | Japan .................... 250/585 |

*Primary Examiner*—Carolyn E. Fields
*Assistant Examiner*—Edward J. Glick
*Attorney, Agent, or Firm*—Sughrue, Mion, Zinn, Macpeak & Seas

[57] ABSTRACT

A photo detecting apparatus comprises a photodetector for detecting light emitted or reflected by a scanning surface scanned with a light beam in main scanning and sub-scanning directions, and a light guide member, which has a light input end face extending along a main scanning line and propagates the emitted or reflected light to a light receiving face of the photodetector. When a point on the scanning surface, which point is being scanned with the light beam, is represented by O in a side view state taken from the main scanning direction, and an arbitrary point of incidence of the emitted or reflected light upon the light input end face is represented by A in the side view state, conditions $\alpha/2 \geq \beta$ and $\theta \geq 15°$ are satisfied, where $\alpha$ represents the angle made between a line OA and the scanning surface, $\beta$ represents the angle made between a direction, along which the light beam reflected from the point A after being reflected or scattered from the point O travels, and the scanning surface, and $\theta$ represents the angle made between a line, which is normal to the scanning surface, and the light input end face.

7 Claims, 4 Drawing Sheets

PHOTO DETECTING APPARATUS

BACKGROUND OF THE INVENTION

1. Field of the Invention

This invention relates to a photo detecting apparatus for detecting light emitted or reflected by a scanning surface, which is scanned with a light beam. This invention particularly relates to a photo detecting apparatus, wherein the emitted light or the reflected light is propagated through a light guide member and is thereby guided to a photodetector.

2. Description of the Prior Art

When certain kinds of phosphors are exposed to radiation such as X-rays, $\alpha$-rays, $\beta$-rays, $\gamma$-rays, cathode rays or ultraviolet rays, they store part of the energy of the radiation. Then, when the phosphor which has been exposed to the radiation is exposed to stimulating rays, such as visible light, light is emitted by the phosphor in proportion to the amount of energy stored thereon during its exposure to the radiation. A phosphor exhibiting such properties is referred to as a stimulable phosphor, As disclosed in U.S. Pat. Nos. 4,258,264, 4,276,473, 4,315,318, 4,387,428, and Japanese Unexamined Patent Publication No. 56(1981)-11395, it has been proposed to use stimulable phosphors in radiation image recording and reproducing systems. Specifically, a radiation image of an object, such as a human body, is recorded on a sheet provided with a layer of the stimulable phosphor (hereinafter referred to as a stimulable phosphor sheet). The stimulable phosphor sheet, on which the radiation image has been stored, is then scanned with stimulating rays, such as a laser beam, which cause it to emit light in proportion to the amount of energy stored during exposure to the radiation. The light emitted by the stimulable phosphor sheet, upon stimulation thereof, is photoelectrically detected and converted into an electric image signal. The electric image signal is then processed, and the processed image signal is used during the reproduction of a visible image which has good image quality and can serve as an effective tool in, particularly, the efficient and accurate diagnosis of an illness.

In the radiation image recording and reproducing systems described above, operations for detecting the light emitted by stimulable phosphor sheets are carried out with one of two methods described below.

In one of the methods, division into picture elements is carried out by the scanning with stimulating rays, and the light emitted by a stimulable phosphor sheet is detected by a light receiving device having a wide light receiving face (for example, a photomultiplier or a photoconductive device). In the other method, division into picture elements is carried out by a light receiving device (for example, a two-dimensional solid state image pickup device or a semiconductor line sensor), and a serial image signal is generated by an electric circuit.

The former method is more advantageous in the sensitivity, the signal-to-noise ratio (S/N ratio) of the read-out signal, or the like, than the latter method using the two-dimensional solid state image pickup device, the semiconductor line sensor, or the like. However, the light emitted by the stimulable phosphor sheet is non-directional and has a low intensity. Therefore, when the former method is carried out, the emitted-light receiving solid angle should be set as large as possible such that much light may be collected and the condensing efficiency can thereby be kept high. If the condensing efficiency is low, the S/N ratio of the read-out signal becomes low and, in the worst case, the readout of the image stored on the stimulable phosphor sheet becomes impossible.

Therefore, special light guide members have heretofore been used widely in order to improve the condensing efficiency for the light emitted by the stimulable phosphor sheet. As disclosed in, for example, Japanese Unexamined Patent Publication No. 56(1981)-12601 and U.S. Pat. Nos. 4,346,295 and 4,485,302, the light guide member is made from a light guiding material, such as an acrylic resin. The light guide member has a flat light input end face, which is positioned so that it extends along a main scanning line of stimulating rays on a stimulable phosphor sheet. The light guide member is rounded little by little from the side of the light input end face towards a cylindrical light output end face. The light output end face is positioned so that it may be connected to a light receiving face of a photodetector. In cases where such a light guide member is used, the light input end face can be located close to the stimulable phosphor sheet, and much light emitted by the stimulable phosphor sheet can thereby be caused to impinge upon the light input end face. Also, the emitted light, which impinges upon the light input end face of the light guide member can be efficiently guided to the light receiving face of the light receiving device through repeated total reflection inside of the light guide member. Accordingly, the condensing efficiency for the light emitted by the stimulable phosphor sheet can be kept high.

A technique for improving the condensing efficiency even further in the system using a light guide member has been proposed in, for example, U.S. Pat. No. 4,680,473. With the proposed technique, a condensing mirror is located on the side opposite to the light guide member with the main scanning line on a stimulable phosphor sheet intervening between the condensing mirror and the light guide member. Light, which is emitted by the stimulable phosphor sheet and which is not directly directed to the light input end face of the bight guide member, is reflected by the condensing mirror and guided to light input end face of the light guide member.

In cases where the light guide member is provided or in cases where the light guide member and the condensing mirror are provided, stimulating rays, which have been reflected from the stimulable phosphor sheet, are again reflected by the light guide member or by the condensing mirror and the light guide member. The thus reflected stimulating rays again impinge upon the stimulable phosphor sheet and stimulate a point on the stimulable phosphor sheet other than the point, which is being scanned. Light emitted by the point on the stimulable phosphor sheet other than the point, which is being scanned, is detected as flare light. If much flare light is detected, the sharpness of the image, which is obtained from the image read-out operation, cannot be kept good.

As described above, the problems with regard to the flare light occur when the light emitted by the stimulable phosphor sheet is detected. The same problems as those described above occur also when a light guide member is used or when a light guide member and a condensing mirror are used in a photo detecting apparatus, wherein light, which is emitted or reflected by a scanning surface when the scanning surface is scanned with a light beam, is detected by a photodetector.

SUMMARY OF THE INVENTION

The primary object of the present invention is to provide a photo detecting apparatus, wherein the adverse effects of flare light are kept as small as possible.

Another object of the present invention is to provide a photo detecting apparatus, wherein an image having good image quality is obtained from a photo detecting operation.

The present invention provides a first photo detecting apparatus comprising:

i) a photodetector for detecting light emitted or reflected by a scanning surface, which is being scanned with a light beam in a main scanning direction and in a sub-scanning direction, and ii) a light guide member, which is made from a light guiding material and has a light input end face extending along a main scanning line on the scanning surface, the light guide member propagating the emitted light or the reflected light, which has entered the light guide member from the light input end face, to a light receiving face of the photodetector, wherein, in cases where a point on the scanning surface, which point is being scanned with the light beam, is represented by O in a side view state taken from the same direction as the main scanning direction, and an arbitrary point of incidence of the emitted light or the reflected light upon the light input end face is represented by A in the side view state, the photo detecting apparatus satisfies the conditions $$\alpha/2 \geq \beta, \text{ and } \theta \geq 15° \quad (1)$$

where $\alpha$ represents the angle made between a line segment OA and the scanning surface, $\beta$ represents the angle made between a direction, along which the light beam reflected from the point A after being reflected or scattered from the point O travels, and the scanning surface, and $\theta$ represents the angle made between a line, which is normal to the scanning surface, and the light input end face.

The present invention also provides a second photo detecting apparatus comprising:

i) a photodetector for detecting light emitted or reflected by a scanning surface, which is being scanned with a light beam in a main scanning direction and in a sub-scanning direction, ii) a light guide member, which is made from a light guiding material and has a light input end face extending along a main scanning line on the scanning surface, the light guide member propagating the emitted light or the reflected light, which has entered the light guide member from the light input end face, to a light receiving face of the photodetector, and iii) a condensing mirror, which is located on the side opposite to the light guide member with the main scanning line intervening between the condensing mirror and the light guide member, the condensing mirror reflecting the light, which has been emitted or reflected by the scanning surface, and guiding the light to the light input end face of the light guide member, wherein, in cases where a point on the scanning surface, which point is being scanned with the light beam, is represented by O in a side view state taken from the same direction as the main scanning direction, and an arbitrary point of incidence of the emitted light or the reflected light, which has been reflected by the condensing mirror, upon the light input end face is represented by A' in the side view state, the photo detecting apparatus satisfies the conditions $$\alpha'/2 \geq \beta', \text{ and } \theta \geq 15° \quad (1)$$

where $\alpha'$ represents the angle made between a line segment OA' and the scanning surface, $\beta'$ represents the angle made between a direction, along which the light beam reflected from the condensing mirror and then from the point A' after being reflected or scattered from the point O travels, and the scanning surface, and $\theta$ represents the angle made between a line, which is normal to the scanning surface, and the light input end face.

FIG. 1 is a schematic view showing how a light guide member is located in the first photo detecting apparatus in accordance with the present invention. In this case, no condensing mirror is provided. In FIG. 1, reference numeral 1 represents the scanning surface, reference numeral 2 represents the light guide member, and reference numeral 2a represents the light input end face of the light guide member 2. Also, reference numeral 3 represents the light beam. As described above, the condition $\alpha/2 \geq \beta$ is satisfied for an arbitrary point of incidence A upon the light input end face 2a. In such cases, for two points of incidence A1 and A2, which are spaced a small distance from each other, the conditions $\alpha1/2 \geq \beta1$ and $\alpha2/2 \geq \beta2$ are satisfied. When an expected angle $\Delta\alpha$ of light from the point O, which light is taken from the region between the two points of incidence A1 and A2 into the light guide member 2, and an expected angle $\Delta\beta$ of light from a point C are considered, if $\beta2 > \beta1$, the following formula obtains.

$$\Delta\beta = \beta2 - \beta1$$

Substitution of $\beta1 = k1 \cdot \alpha1$ and $\beta2 = k2 \cdot \alpha2$ (wherein k1 and k2 are values varying in accordance with the shape of the light input end face 2a) into the aforesaid formula yields $$\Delta\beta = k2 \cdot \alpha2 - k1 \cdot \alpha1$$

The point A2 is spaced a small distance from the point A1. Therefore, the shape of the light input end face 2a does not change discontinuously or sharply between the points A1 and A2. Accordingly, k2 is approximately equal to k1, and the aforesaid formula can be rewritten as $$\Delta\beta = k1(\alpha2 - \alpha1) = k1 \cdot \Delta\alpha$$

The formula $\alpha1/2 \geq \beta1$ gives $k1 \leq 1/2$. Therefore, the formula obtains $$\Delta\beta \leq \Delta\alpha/2$$

Specifically, the amount of flare light, which is emitted from the point C and is taken into the light guide member 2, is approximately one-half the amount of light, which is emitted from the point O and is taken into the light guide member 2. In general, the amount of flare, which returns after being reflected by the light input end face 2a, or the like, will be originally large. Therefore, if the amount of flare returning to the light input end face 2a can be reduced to at most one half of the amount of the emitted light, which is to be detected, the image quality of the image obtained from the image read-out operation can be kept very good.

In such cases, the angle of inclination $\theta$ of the light input end face 2a of the light guide member 2, i.e. the angle made between the line, which is normal to the scanning surface 1, and the light input end face 2a, should not be set very small. The condensing efficiency becomes lower as the angle of inclination $\theta$ is smaller. Reduction in flare and the condensing efficiency are incompatible with each other. It has been found that, if the condensing efficiency reduces approximately 20 to 30%, decrease in the image quality is perceived. Therefore, in experiments carried out by the inventor, conditions were set such that a safety factor of 2 to 3 times was expected, and reduction in the condensing efficiency by approximately 10% of the maximum value was tolerated. Results of calculation of the condensing efficiency through simulation using a computer revealed that, if $\theta \geq 15°$, reduction in the condensing efficiency can be restricted to approximately 10% of the maximum value.

FIG. 2 is a schematic view showing how a light guide member 2 and a condensing mirror 5 are located in the second photo detecting apparatus in accordance with the present invention. In this case, as in the case of FIG. 1, if the condition $\alpha'/2=\beta'$ is satisfied, the amount of flare light, which is emitted from the point C' and is taken into the light guide member 2, is approximately one-half the amount of light, which is emitted from the point O and is taken into the light guide member 2. Therefore, as in the case of FIG. 1, the adverse effects of the flare light can be reduced markedly.

Also, in this case, if $\theta \geq 15°$, reduction in the condensing efficiency can be restricted to approximately 10% of the maximum value, and decrease in the image quality due to reduction in the condensing efficiency can be kept imperceptible.

DESCRIPTION OF THE PREFERRED EMBODIMENTS

The present invention will hereinbelow be described in further detail with reference to the accompanying drawings.

Figure 1:
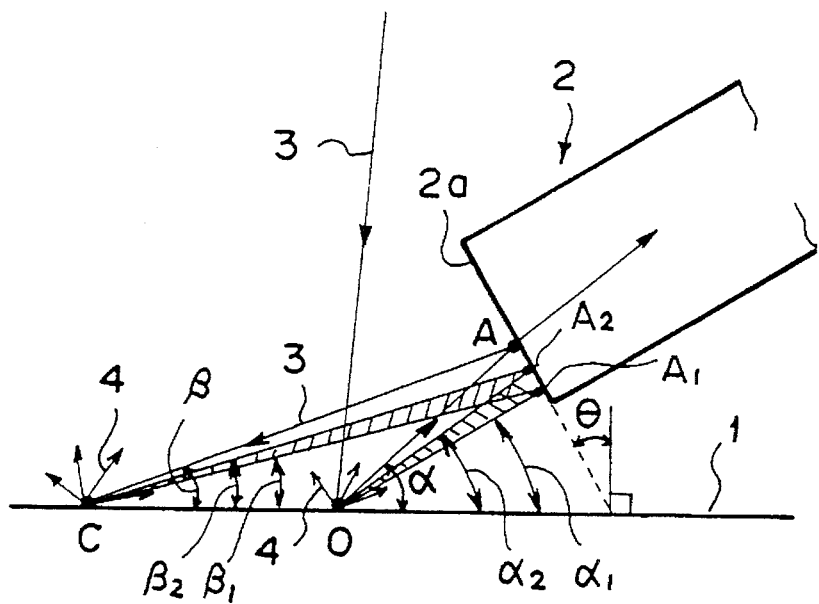
FIG. 1 is a schematic view showing how a light guide member is located in the first photo detecting apparatus in accordance with the present invention.
Figure 2:
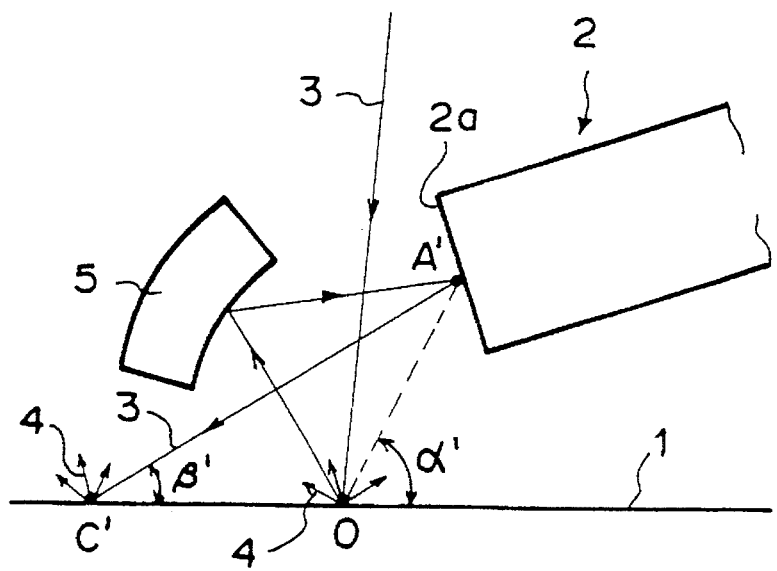
FIG. 2 is a schematic view showing how a light guide member and a condensing mirror are located in the second photo detecting apparatus in accordance with the present invention.
Figure 3:
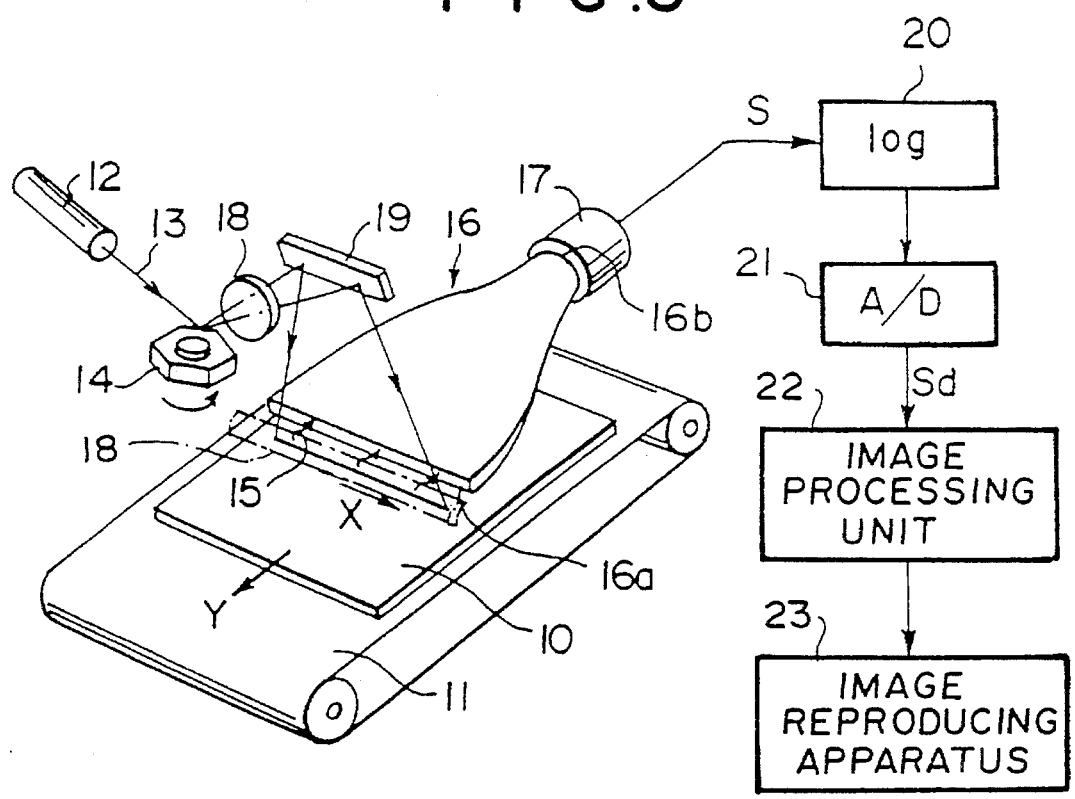
FIG. 3 is a schematic perspective view showing a radiation image read-out apparatus, in which the photo detecting apparatus in accordance with the present invention is employed.
Figure 4:
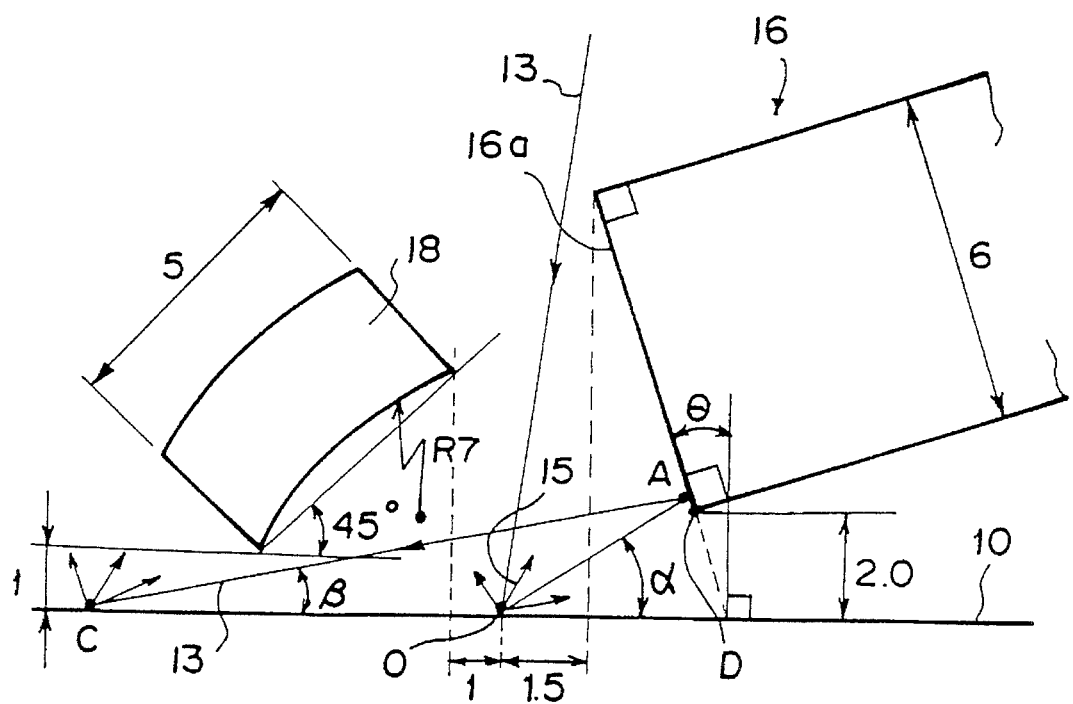
FIG. 4 is a side view showing the major part of a first embodiment of the photo detecting apparatus in accordance with the present invention.

FIG. 3 shows a radiation image read-out apparatus, in which a first embodiment of the photo detecting apparatus in accordance with the present invention is employed. FIG. 4 is a side view showing a light guide member 16 and a condensing mirror 18 constituting the first embodiment of the photo detecting apparatus in accordance with the present invention.

With reference to FIG. 3, a stimulable phosphor sheet 10 has been exposed to radiation, such as X-rays, which has, by way of example, passed through an object. A radiation image of the object has thereby been stored on the stimulable phosphor sheet 10. The stimulable phosphor sheet 10, on which the radiation image has been stored, is then conveyed in a sub-scanning direction indicated by the arrow Y by a sheet conveyance means 11. The sheet conveyance means 11 may be constituted of an endless belt, or the like. A laser beam 13, which serves as stimulating rays, is produced by a laser beam source 12, and is deflected by a rotating polygon mirror 14 which is rotated quickly. The laser beam 13 is then converged by a converging lens 18, which is ordinarily constituted of an f$\theta$ lens. Thereafter, the laser beam 13 is reflected by a mirror 19, and is caused to scan the stimulable phosphor sheet 10 in a main scanning direction indicated by the arrow X, which direction is approximately normal to the sub-scanning direction indicated by the arrow Y.

When the stimulable phosphor sheet 10 is exposed to the laser beam 13, the exposed portion of the stimulable phosphor sheet 10 emits light 15 in an amount proportional to the amount of energy stored thereon during its exposure to the radiation. The emitted light 15 is condensed by a light guide member 16 and photoelectrically detected by a photodetector 17, which may be constituted of a photomultiplier. The light guide member 16 is made from a light guiding material such as an acrylic plate and has a linear light input end face 16a, which is positioned so that it extends along the main scanning line on the stimulable phosphor sheet 10, and a ring-shaped light output end face 16b, which is positioned so that it is in close contact with a light receiving face of the photodetector 17. The emitted light 15, which has entered the light guide member 16 at its light input face 16a, is guided through repeated total reflection inside of the light guide member 16, emanates from the light output face 16b, and is received by the photodetector 17. In this manner, the amount of the emitted light 15, which amount represents the radiation image, is converted into an electric signal by the photodetector 17.

In the manner described above, an analog output signal (image signal) S is generated by the photodetector 17. The analog output signal S is amplified by a logarithmic amplifier 20 and is then digitized into a digital image signal Sd with a predetermined scale factor in an A/D converter 21. The digital image signal Sd thus obtained is fed into an image processing unit 22, which carries out image processing, such as gradation processing and frequency response processing, on the digital image signal Sd. The image signal Sd obtained from the image processing is fed into an image reproducing apparatus 23, which may be constituted of a CRT display device, a light beam scanning and recording apparatus, or the like. In the image reproducing apparatus 23, the image represented by the image signal Sd, i.e. the radiation image which was stored on the stimulable phosphor sheet 10, is reproduced as a visible image from the image signal Sd.

The light guide member 16 and the condensing mirror 18, which constitute this embodiment of the photo detecting apparatus together with the photodetector 17, will be described hereinbelow with reference to FIG. 4. FIG. 4 is a side view of the light guide member 16 and the condensing mirror 18, which side view is taken from the same direction as the main scanning direction X with the laser beam 13. In FIG. 4, values representing the dimensions are in units of mm. In the structure shown in FIG. 4, a point on the stimulable phosphor sheet 10, which point is being scanned with the laser beam 13, is represented by O in the side view state. An arbitrary point of incidence of the emitted light 15 upon the light input end face 16a of the light guide member 16 is represented by A in the side view state. The angle made between a line segment OA and the surface of the stimulable phosphor sheet 10, which serves as the scanning surface, is represented by α. The angle made between the direction, along which the laser beam 13 reflected from the point A after being reflected or scattered from the scanning point O travels, and the surface of the stimulable phosphor sheet 10 is represented by β. Also, the angle made between a line, which is normal to the surface of the stimulable phosphor sheet 10, and the light input end face 16a is represented by θ.

With this structure, the light input end face 16a of the light guide member 16 is flat. Therefore, the laser beam 13, which is reflected from the lower end point D of the light input end face 16a after being reflected by the surface of the stimulable phosphor sheet 10, is closest to the point O. Therefore, the angle of inclination θ of the light guide member 16, which angle satisfies the aforesaid condition $\alpha/2 \geq \beta$, falls within the range of $\theta \leq 21°$. In this embodiment, the laser beam 13, which is reflected from the scanning point O and then from the condensing mirror 18 and which thereafter impinges upon the light input end face 16a, is not taken into consideration. For such purposes, the reflecting surface of the condensing mirror 18 is provided with a coating layer, which reflects the emitted light 15 and substantially transmits the laser beam 13 serving as the stimulating rays. In cases where the reflecting surface of the condensing mirror 18 is provided with such a coating layer, the amount of the laser beam 13, which is reflected by the stimulable phosphor sheet 10 and the light input end face 16a, which is thereafter reflected by the condensing mirror 18, and which then impinges upon the stimulable phosphor sheet 10, can be reduced.

Figure 5:
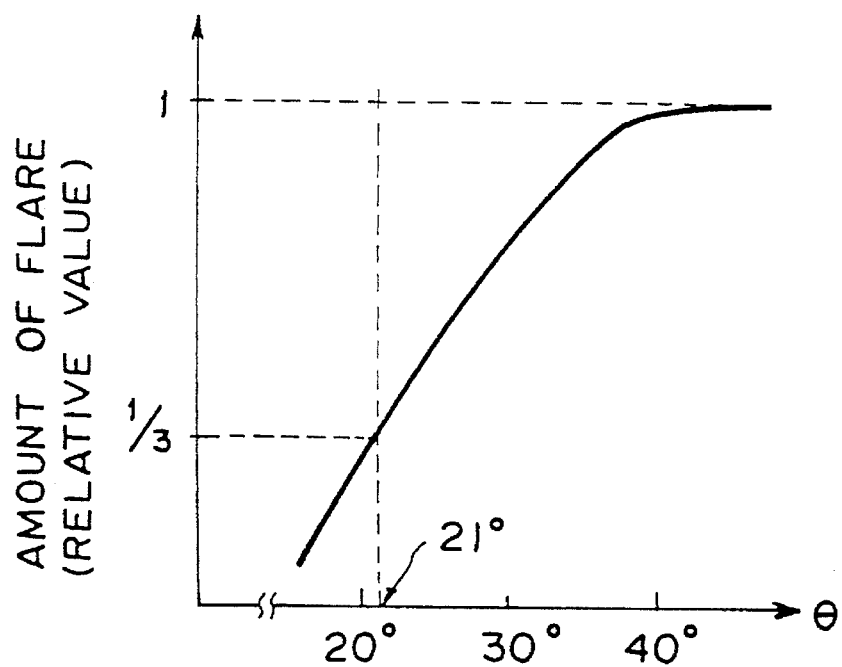
FIG. 5 is a graph showing the relationship between an angle of inclination of a light guide member and an amount of flare light in the first embodiment of the photo detecting apparatus in accordance with the present invention.

FIG. 5 shows the results of simulation with a computer concerning how the amount of flare light changes when the angle θ is varied. As clearly shown in FIG. 5, when the condition is set such that $\theta \leq 21°$, the amount of flare light can be reduced to at most approximately ⅓ of the maximum value.

Figure 6:
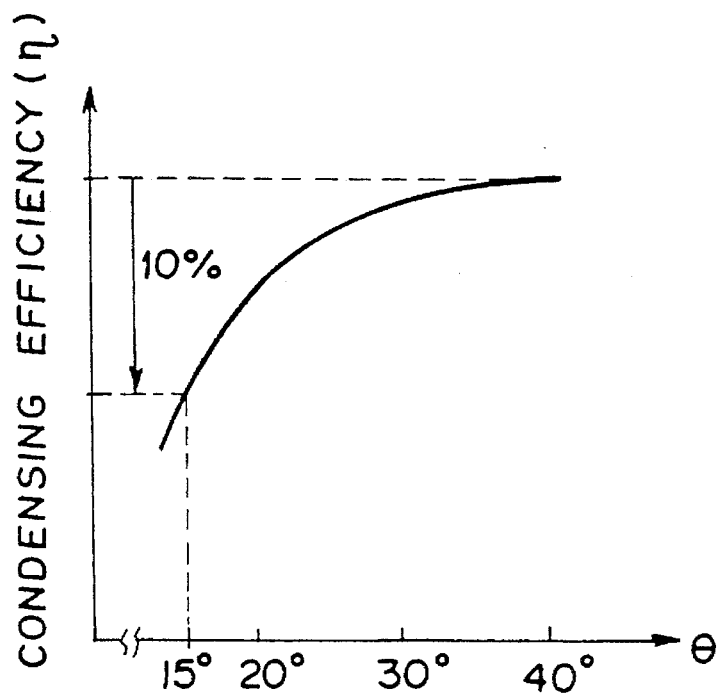
FIG. 6 is a graph showing the relationship between an angle of inclination of a light guide member and a condensing efficiency in the first embodiment of the photo detecting apparatus in accordance with the present invention.

FIG. 6 shows the results of simulation with a computer concerning the relationship between the angle of inclination θ of the light guide member 16 and the condensing efficiency η for the emitted light 15. As shown in FIG. 6, the condensing efficiency η decreases as the angle of inclination θ becomes smaller. When θ= 15°, the condensing efficiency η decreases by approximately 10% of the maximum value. Therefore, in this embodiment, a decrease in the condensing efficiency η by at most approximately 10% of the maximum value is tolerated. Also, by considering the limitation from the view point of reduction in flare, the condition of $15° \leq \theta \leq 21°$ is set. By such setting of the angle of inclination θ of the light guide member 16, sufficient effects of reducing flare can be obtained, and the condensing efficiency can be kept sufficiently high.

As disclosed in U.S. Pat. No. 4,818,880, the light input end face 16a should preferably be provided with an anti-reflection (AR) coating layer with respect to the laser beam 13. In such cases, the adverse effects of flare can be reduced even further.

Figure 7:
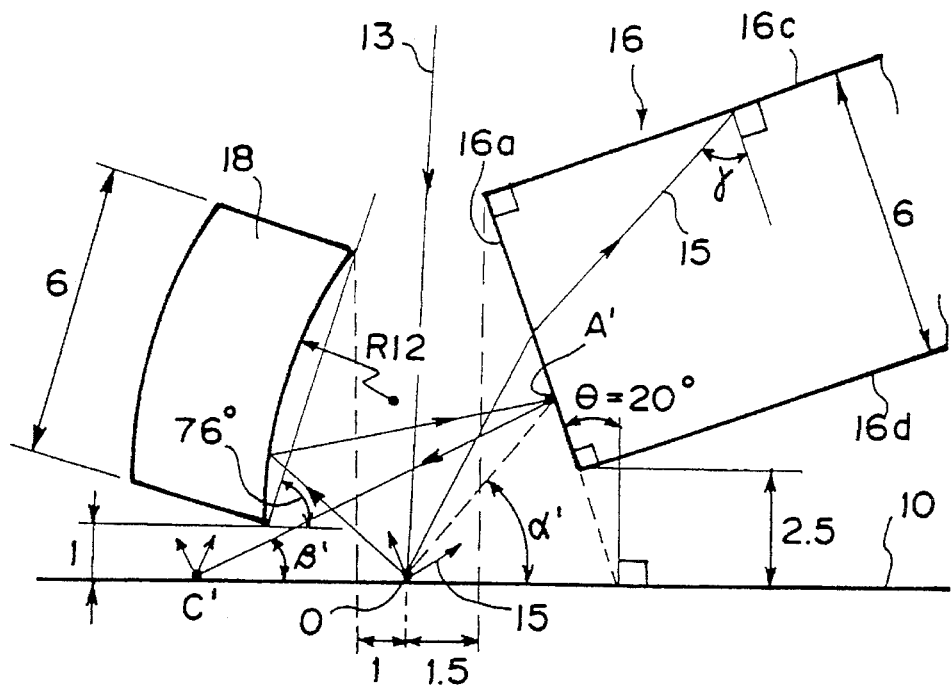
FIG. 7 is a side view showing the major part of a second embodiment of the photo detecting apparatus in accordance with the present invention.

A second embodiment of the photo detecting apparatus in accordance with the present invention will be described hereinbelow with reference to FIG. 7. In FIG. 7, similar elements are numbered with the same reference numerals with respect to FIG. 4. (This also applies to FIG. 8.)

FIG. 7 is a side view of the light guide member 16 and the condensing mirror 18, which are employed in the radiation image read-out apparatus of FIG. 3. In FIG. 7, a point on the stimulable phosphor sheet 10, which point is being scanned with the laser beam 13, is represented by O in the side view state. An arbitrary point of incidence of the emitted light 15, which has been reflected by the stimulable phosphor sheet 10 and the condensing mirror 18, upon the light input end face 16a of the light guide member 16 is represented by A' in the side view state. The angle made between a line segment OA' and the surface of the stimulable phosphor sheet 10, which serves as the scanning surface, is represented by α'. The angle made between a direction, along which the laser beam 13 reflected from the condensing mirror 18 and then from the point A' after being reflected or scattered from the scanning point O travels, and the surface of the stimulable phosphor sheet 10 is represented by β'.

Also, in this embodiment, the angle θ made between a line, which is normal to the surface of the stimulable phosphor sheet 10, and the light input end face 16a of the light guide member 16 is set at 20°. As a result, the condition $\alpha'/2 \geq \beta'$ is satisfied. Therefore, in this embodiment, sufficient effects of reducing flare can be obtained. Specifically, results obtained from simulation using a computer revealed that the amount of flare light can be reduced to approximately ¹⁄₁₀ of the value obtained when θ=40° in the structure of FIG. 4.

In cases where the edge angle of the light guide member 16 (i.e. the angle made between the light input end face 16a and an upper surface 16c or a lower surface 16d) is 90°, if the angle of inclination θ of the light guide member 16 is set at approximately 20° in order to reduce flare, the angle of incidence γ of the emitted light 15, which is guided through repeated total reflection inside of the light guide member 16, upon each of the surfaces 16c and 16d of the light guide member 16 will become very small. Therefore, a large loss will occur in light propagation due to bending or flaws of the light guide member 16. In order to reduce the light propagation loss, the edge angle should preferably be set such that the aforesaid angle of incidence γ of the emitted light 15 passing through the middle point of the light input end face 16a, which middle point is taken with respect to the thickness direction of the light guide member 16, may be, for example, at least 70° (the total reflection critical angle is 42° when the refractive index n of the material of the light guide member 16 is equal to 1.5).

Figure 8:
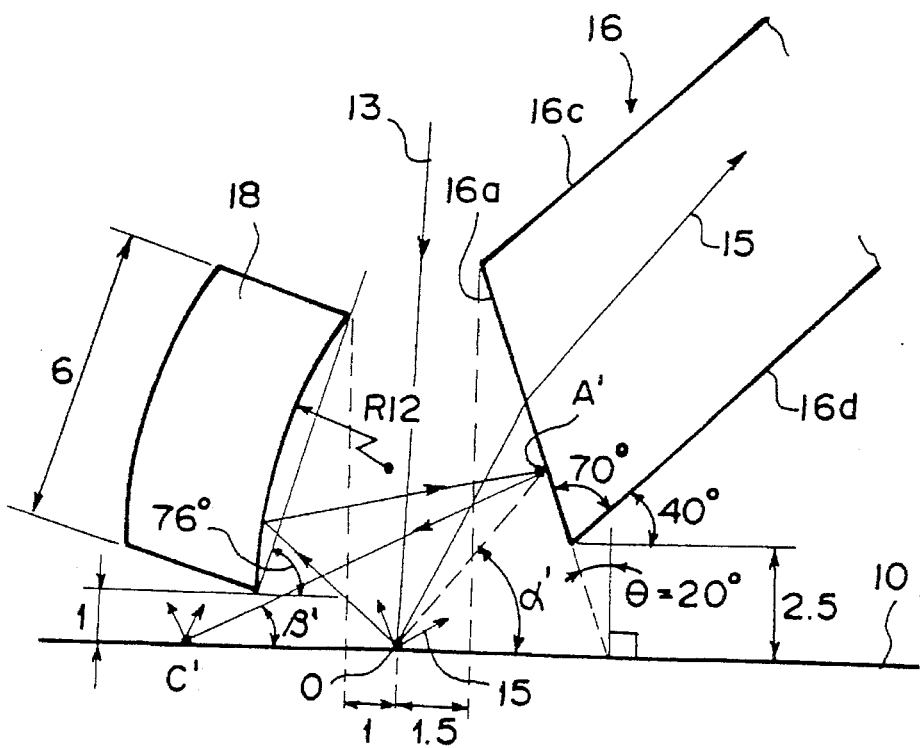
FIG. 8 is a side view showing the major part of a third embodiment of the photo detecting apparatus in accordance with the present invention.

A third embodiment of the photo detecting apparatus in accordance with the present invention will be described hereinbelow with reference to FIG. 8. In this embodiment, the shape and the location of the condensing mirror 18 are the same as those in the second embodiment. Also, the angle of inclination θ is 20° as in the second embodiment. However, the edge angle of the light guide member 16 is set at 70°. With this structure, the aforesaid angle of incidence γ of the emitted light 15 passing through the middle point of the light input end face 16a, which middle point is taken with respect to the thickness direction of the light guide member 16, becomes as large as 72°. Therefore, the light propagation loss due to bending or flaws of the light guide member 16 can be kept small.

In the embodiments described above, the light 15 emitted by the stimulable phosphor sheet 10 is detected. The photo detecting apparatus in accordance with the present invention is also applicable when other types of emitted light or light reflected from an image to be read out is detected.

What is claimed is:

1. A photo detecting apparatus comprising:
   i) a photodetector for detecting light emitted or reflected by a stimulable phosphor scanning surface having a radiation image stored therein, said scanning surface being scanned with a light beam in a main scanning direction and in a sub-scanning direction, and ii) a light guide member, which is made from a light guiding material and has a light input end face extending along a main scanning line on the scanning surface, the light guide member propagating the emitted light or the reflected light, which has entered the light guide member from the light input end face, to a light receiving face of the photodetector, wherein, in cases where a point on the scanning surface, which point is being scanned with the light beam, is represented by O in a side view state taken from the same direction as the main scanning direction, an arbitrary point of incidence of the emitted light or the reflected light upon the light input end face is represented by A in the side view state, and another point on the scanning surface, which another point is stimulated by the light beam reflected from the point A after being reflected or scattered from the point O, is represented by C, the photo detecting apparatus satisfies the conditions $$\alpha/2 \geq \beta, \text{ and } \theta \geq 15°  \qquad (1)$$

where $\alpha$ represents the angle made between a line segment OA and the scanning surface, $\beta$ represents the angle made between a line segment AC and the scanning surface, and $\theta$ represents the angle made between a line, which is normal to the scanning surface, and the light input end face.

2. An apparatus as defined in claim 1 wherein said light beam is stimulating rays, which cause the stimulable phosphor sheet to emit light in proportion to the amount of energy stored thereon during its exposure to radiation.

3. An apparatus as defined in claim 2 wherein said stimulating rays is a laser beam.

4. A photo detecting apparatus comprising:

i) a photodetector for detecting light emitted or reflected by a stimulable phosphor scanning surface having a radiation image stored therein, said scanning surface being scanned with a light beam in a main scanning direction and in a sub-scanning direction, ii) a light guide member, which is made from a light guiding material and has a light input end face extending along a main scanning line on the scanning surface, the light guide member propagating the emitted light or the reflected light, which has entered the light guide member from the light input end face, to a light receiving face of the photodetector, and iii) a condensing mirror, which is located opposite the light guide member with the main scanning line intervening between the condensing mirror and the light guide member, the condensing mirror reflecting the light, which has been emitted or reflected by the scanning surface, and guiding the light to the light input end face of the light guide member, wherein, in cases where a point on the scanning surface, which point is being scanned with the light beam, is represented by O in a side view state taken from the same direction as the main scanning direction, a first arbitrary point of incidence of the emitted light or the reflected light, which has been reflected by the condensing mirror, upon the light input end face is represented by A' in the side view state, and another point on the scanning surface, which another point is stimulated by the light beam reflected from the point A' after being reflected or scattered from the point O and then from the condensing mirror, is represented by C', the photo detecting apparatus satisfies the conditions $$\alpha'/2 \geq \beta', \text{ and } \theta \geq 15°  \qquad (1)$$

where $\alpha'$ represents the angle made between a line segment OA' and the scanning surface, $\beta'$ represents the angle made between a line segment A'C' and the scanning surface, and $\theta$ represents the angle made between a line, which is normal to the scanning surface, and the light input end face.

5. An apparatus as defined in claim 4 wherein, a second arbitrary point of incidence of the emitted light or the reflected light upon the light input end face is represented by A in the side view state, and a point on the scanning surface, which is stimulated by the light beam reflected from the point A after being reflected or scattered from the point O, is represented by C, the photo detecting apparatus satisfies the conditions $$\alpha/2 \geq \beta, \text{ and } \theta \geq 15°  \qquad (2)$$

where $\alpha$ represents the angle made between a line segment OA and the scanning surface, and $\beta$ represents the angle made between a line segment AC and the scanning surface.

6. An apparatus as defined in claim 4 wherein said light beam is stimulating rays, which cause the stimulable phosphor sheet to emit light in proportion to the amount of energy stored thereon during its exposure to radiation.

7. An apparatus as defined in claim 6 wherein said stimulating rays is a laser beam.

* * * * *